(No Model.)
F. K. ROBERTS.
SPECTACLES.
No. 291,778. Patented Jan. 8, 1884.
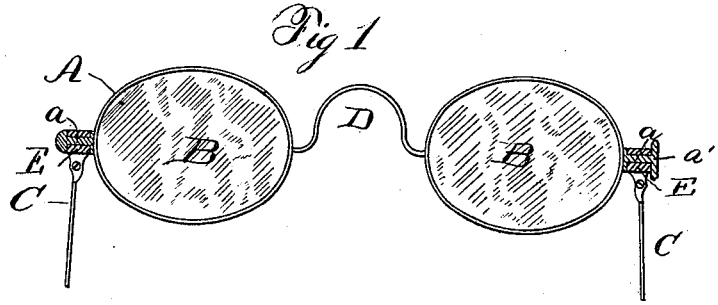
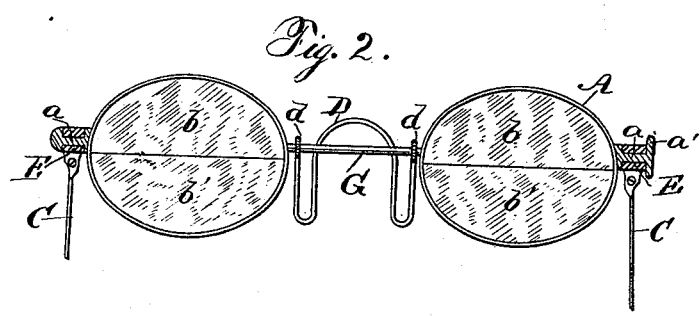
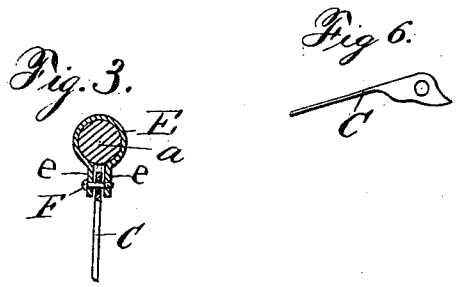
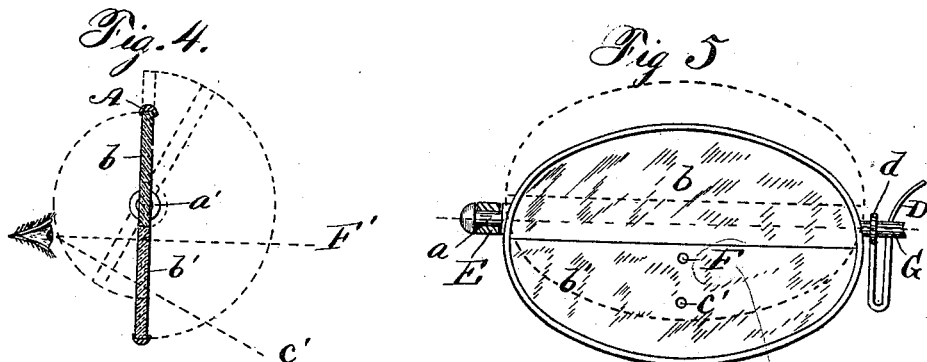
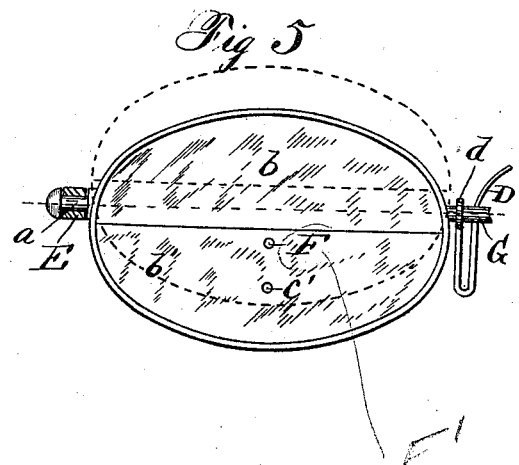
Witnesses
Chas. R. Burr
W. E. Bowen
Inventor
Frank K. Roberts
by W. H. Babcock
Attorney.

UNITED STATES PATENT OFFICE.

FRANK K. ROBERTS, OF PHILADELPHIA, PENNSYLVANIA.

SPECTACLES.

SPECIFICATION forming part of Letters Patent No. 291,778, dated January 8, 1884.

Application filed November 26, 1883. (No model.)

*To all whom it may concern:*

Be it known that I, FRANK K. ROBERTS, a citizen of the United States, residing at Philadelphia, in the county of Philadelphia and State of Pennsylvania, have invented certain new and useful Improvements in Spectacles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The chief object of this invention is to allow the lenses of spectacles and eyeglasses to the various angles which correspond to the lines of vision, so that the eyes may look through them at right angles to the planes of said lenses, whether the object looked at be close at hand and below the level of the eyes, as a book, or so distant as to be practically on a level with the eyes.

In the accompanying drawings, Figure 1 represents a pair of spectacles embodying my invention, each frame containing only a single glass; and Fig. 2 represents a pair of spectacles, each lens being divided longitudinally, so as to form two of different foci—one for distant vision and one for near vision, the said spectacles also embodying my invention. These figures are taken in front elevation with clamping devices in section. Fig. 3 represents a detail view, partly in section, of the devices for allowing the adjustment of the glasses to the inclination desired. Fig. 4 represents a vertical section taken transversely through a lens constructed as in Fig. 2, the lines of vision being indicated thereon; and Fig. 5 represents a front view of said lens, the same being also shown in dotted lines, with the lenses reversed. Fig. 6 shows a detail view of part of one of the temples provided with a shoulder, to prevent it from turning too far. I do not claim any novelty in this, it being common in spectacles. Each temple is constructed with a shoulder like that shown in said figure.

In said drawings, A designates the lens-frames; B, the lenses; C, the temples, and D the bridge. In Fig. 1, each lens is of a single piece of glass, having only one focus, and the bridge is attached directly to the lens-frames A in the ordinary way. The temples are attached at their upper ends to short cylindrical stems $a$, which are in continuation of the central longitudinal lines of lenses B. This attachment is effected in each instance by means of a clamp consisting of a short sleeve or collar, E, encircling one of said stems and divided at the bottom, where it forms two parallel ears, $e$, through which a tightening-screw, F, is passed. The middle part of said screw being unthreaded, serves as a pintle, which passes through an eye in the upper (or when in use the forward) end of the temple. This construction allows the temples to fold readily against the bridge and frames when not in use, so that the screws F have the functions of ordinary temple-fastenings, beside serving for the adjustment of the lenses to different inclinations, as desired. To effect this latter result the screws F may be tightened sufficiently to allow the lenses and their frames to be turned to the proper angle, and the friction produced by the screw will hold them securely in that angle. This adjustability of the lenses makes it possible for the eyes to look straight through them at right angles to the lens whatever be the position or location of the object of vision. Thus the lenses may be used in a vertical position for looking at a distant object or one on a level with the eyes, and afterward turned downward for reading a book held below the eyes and in front of the person. When spectacles of the ordinary construction are used, the line of sight necessarily passes through the lenses more or less obliquely in looking at anything above or below the level of the eyes and near the person, and consequently vision is imperfect and the eyes are strained. This is due partly to the greater thickness of glass through which the eye sees and partly to the fact that the eye is somewhat out of focus. My construction obviates these defects by preserving unchanged the relative position of the angle of the lens with the line of vision, whatever may be the location of the object looked at.

In Figs. 2, 4, and 5 I have illustrated my invention as applied to spectacles having divided lenses, the upper half, $b$, of each lens being of a different focus from that of $b'$, the lower half. When thus constructed the stems $a$, already described, are attached to the frames A on a line above the central line of the lenses, the latter coinciding with the line of separation of the parts $b\ b'$. A rod or bar, G, connects the inner ends of said frames, and is on the axial line formed by said stems $a$. The bridge D is not connected directly to the lens-frames, but is provided with eyes $d$, which encircle bar G, and allow the latter to turn with said lens-frames and the lenses while the bridge maintains its position on the wearer's nose.

The operation is substantially the same as that before stated, except that the glasses should be turned completely around as well as inclined before being set in position for reading. Owing to the location of the axial line of their rotation above their central line, this motion causes a thicker part of the lens (one nearer the periphery) to come into the line of vision than the part which was presented before such reversal. The point $F'$ in Fig. 5 indicates approximately the line of passage for far vision, and the point $c'$ in said figure indicates approximately the same for near vision.

To one of the stems $a$ a milled head, $a'$, is attached for convenience in turning and inclining the frames, lenses, &c. Of course the above-described improvements may be applied to a single eyeglass. When the divided lenses are used with the axis above the center, as shown in Fig. 2, there will be no need to make the halves $b\ b'$ different from divided lenses which have hitherto been used.

Having thus described my invention, what I claim as new, and desire to secure by Letters Patent, is—

1. A lens-frame and lens, in combination with a temple or arm, and a clamping device connecting said frame and said temple, said device being adapted to adjust said frame and hold it at different angles of inclination, substantially as set forth.

2. A lens-frame provided with a stem, $a$, in combination with a temple having an eye in its upper and forward end, a clamping collar or sleeve, which is divided and constructed with perforated lugs, and a screw which passes through said lugs and said eye, and causes said collar to clasp said stem tightly, said screw also serving as a pintle for attaching said temple, substantially as set forth.

3. A pair of spectacles having the lens-frames connected by a bar, arranged wholly between said frames and attached at its ends thereto, the bridge or bow being attached to said bar, but allowing the latter to turn with said frames while the bridge remains stationary.

4. A divided lens having the line of division coincident with its longitudinal central line, in combination with a frame inclosing said lens and devices arranged at its ends, but above or below the central line thereof, whereby said lens may be turned upon a longitudinal axis above or below said central line, substantially as set forth.

In testimony whereof I affix my signature in presence of two witnesses.

FRANK K. ROBERTS.

Witnesses:
WM. K. SHRYOCK,
W. A. MOTHERWELL.